(12) United States Patent
Israel et al.

(10) Patent No.: US 11,012,476 B2
(45) Date of Patent: May 18, 2021

(54) PROTECTING IOT DEVICES BY BEHAVIOURAL ANALYSIS OF THEIR FILE SYSTEM

(71) Applicant: MICROSOFT TECHNOLOGY LICENSING, LLC, Redmond, WA (US)

(72) Inventors: Moshe Israel, Ramat-Gan (IL); Shira Itzhaki, Tel Aviv (IL); Yotam Livny, Gadera (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 238 days.

(21) Appl. No.: 16/196,184

(22) Filed: Nov. 20, 2018

(65) Prior Publication Data

US 2020/0162516 A1 May 21, 2020

(51) Int. Cl.
*H04L 29/06* (2006.01)
*G06F 16/11* (2019.01)
*G06N 20/00* (2019.01)

(52) U.S. Cl.
CPC ............ *H04L 63/205* (2013.01); *G06F 16/11* (2019.01); *G06N 20/00* (2019.01)

(58) Field of Classification Search
CPC ... H04L 63/205; H04L 63/20; H04L 41/0893; H04L 63/1416; G06F 16/11; G06F 21/566; G06F 21/552; G06F 2221/034; G06N 20/00
See application file for complete search history.

(56) References Cited

U.S. PATENT DOCUMENTS 10,652,257 B1 * 5/2020 Shah ........................ G06N 7/00
2005/0037733 A1 * 2/2005 Coleman ................ H04B 7/086
455/411

(Continued)

FOREIGN PATENT DOCUMENTS

WO 2018031778 A1 2/2018

OTHER PUBLICATIONS

"International Search Report and Written Opinion Issued in PCT Application No. PCT/US2019/58621", dated Feb. 6, 2020, 14 Pages. (MS# 405360-WO-PCT).

*Primary Examiner* — Sarah Su
(74) *Attorney, Agent, or Firm* — Workman Nydegger

(57) ABSTRACT

Techniques are provided to automatically generate and apply policy rules for IoT devices. Historical data associated with IoT behaviors is obtained, where the historical data describes the file systems and behavior trends for multiple different IoT devices. Groups of the IoT devices are generated by grouping together devices identified as being common with one another based on similarities between their identified behaviors. Policies are then automatically generated for each group, corresponding to the detected behavior trends. Each policy determines how to subsequently monitor any device categorized as belonging to that policy's group and also how to respond when a device is operating abnormally. After a device is characterized as belonging to a group, that device is monitored to determine whether it conforms with the group's policy. Optionally, mitigation operations may be performed when the device is non-conforming.

20 Claims, 8 Drawing Sheets

(56) References Cited

U.S. PATENT DOCUMENTS

| | | | |
|---|---|---|---|
| 2005/0193225 A1* | 9/2005 | Macbeth | G06F 11/0709 |
| | | | 714/2 |
| 2007/0143827 A1* | 6/2007 | Nicodemus | H04L 63/102 |
| | | | 726/2 |
| 2010/0250634 A1* | 9/2010 | Torii | G06F 21/604 |
| | | | 707/827 |
| 2015/0163121 A1 | 6/2015 | Mahaffey et al. | |
| 2016/0125209 A1* | 5/2016 | Meyers | G06F 21/6218 |
| | | | 340/10.1 |
| 2016/0285694 A1* | 9/2016 | Maes | H04L 41/22 |
| 2017/0251012 A1* | 8/2017 | Stockdale | H04L 63/1425 |
| 2017/0308802 A1* | 10/2017 | Ramsoy | G06N 20/10 |
| 2018/0150635 A1* | 5/2018 | Melvin | G06F 21/552 |
| 2018/0191759 A1 | 7/2018 | Baijal et al. | |
| 2019/0347418 A1* | 11/2019 | Strogov | G06F 16/122 |
| 2019/0364131 A1* | 11/2019 | Rogynskyy | G06F 16/254 |
| 2020/0314141 A1* | 10/2020 | Vajipayajula | H04L 63/1416 |
| 2020/0358792 A1* | 11/2020 | Bazalgette | H04L 63/1416 |

* cited by examiner

PROTECTING IOT DEVICES BY BEHAVIOURAL ANALYSIS OF THEIR FILE SYSTEM

BACKGROUND

Computers and computing systems have affected nearly every aspect of modern living. For instance, computers are generally involved in work, recreation, healthcare, transportation, and entertainment. Even household and business operations are now being managed via computers, such as through the use of Internet of Things ("IoT") devices.

In fact, IoT devices are becoming more and more common, with estimates reaching into the billions of devices worldwide. As used herein, the term IoT device should be interpreted broadly to mean any type of standard or non-standard computing device that is either connected via a wire or wirelessly to a network. Furthermore, such devices include the ability to both transmit and receive data. IoT devices are often used to connect vehicles, homes, appliances, or any other type of electronic device to the Internet or even to another computing device. In this regard, as used herein, any type of standalone computing device can be considered an IoT device. In some cases, an IoT device may have a complex computing architecture/configuration and may perform multiple complex processes in parallel or in series with one another. In other cases, an IoT device may have a simplified computing architecture/configuration and may perform only a few simplified tasks or perhaps only one task repeatedly. Notwithstanding this vast diversity in how IoT devices may be structured, most, if not all, IoT devices include at least a rudimentary type of file system which is used to store and manage the IoT device's operational framework.

Unfortunately, with the widespread prevalence of IoT devices, malicious parties are actively trying to exploit this emerging technology. In response to these exploitations, a few new security techniques have been developed in an effort to protect different types of IoT devices. However, such security measures have been unsuccessful across all IoT devices due to the wide diversity of IoT devices and lack of standardization. Accordingly, there exists a substantial need to improve how IoT devices are preemptively protected against malicious attacks as well as a substantial need to improve how attacks against IoT devices are identified and then corrected or mitigated.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to computer systems, methods, and devices that dynamically generate policy rules based on identified device behavior and that then apply those policy rules to determine whether a particular device is conforming or not conforming with the policy rules. Optionally, any number of mitigation operations may be performed to correct a non-conforming device's behavior.

In some embodiments, historical data is obtained for each device included among a set of multiple different devices. This historical data describes each of those devices' corresponding file system (e.g., descriptions of files, folders, structure, dependencies, libraries, and so forth within the file system). As used herein, the historical data constitutes a corpus of training data that will be used to train a machine learning model to identify device behaviors/trends and to generate policies based on the behaviors. Different groups or clusters of devices are then formed by grouping together devices identified as sharing similarities between their different behavioral trends. Once the different groups are formed, then policies are automatically generated for each of those different groups. That is, each group has its own set of policies, and these policies are derived (automatically in some instances) from the detected behavioral trends and through the use of machine learning and other monitoring techniques.

Although each group has its own policy, the policies are somewhat related to one another in that all of the policies determine how certain devices (i.e. any devices included within that policy's group) are to be subsequently monitored and potentially corrected. Once the groups are formed and once the policies are created, then a particular device, which is either a device already included in one of the groups or an entirely new device that is added to one of the groups, is monitored to determine whether that device's behavior conforms with that group's policy. If it conforms, then no mitigation operations will be performed. If it does not conform, then the embodiments may perform any number of different corrective/mitigative operations to fix or otherwise respond to the abnormal/non-conforming, or rather unanticipated, behavior. In this regard, the embodiments provide a universal, lightweight, and easy-to-implement solution to protecting devices, especially devices that are characterized as being Internet-of-Things ("IoT") devices. In some instances, an influx or persistence of unanticipated behaviors for a plurality of different IoT devices can also trigger the modification of an established policy for a corresponding group This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
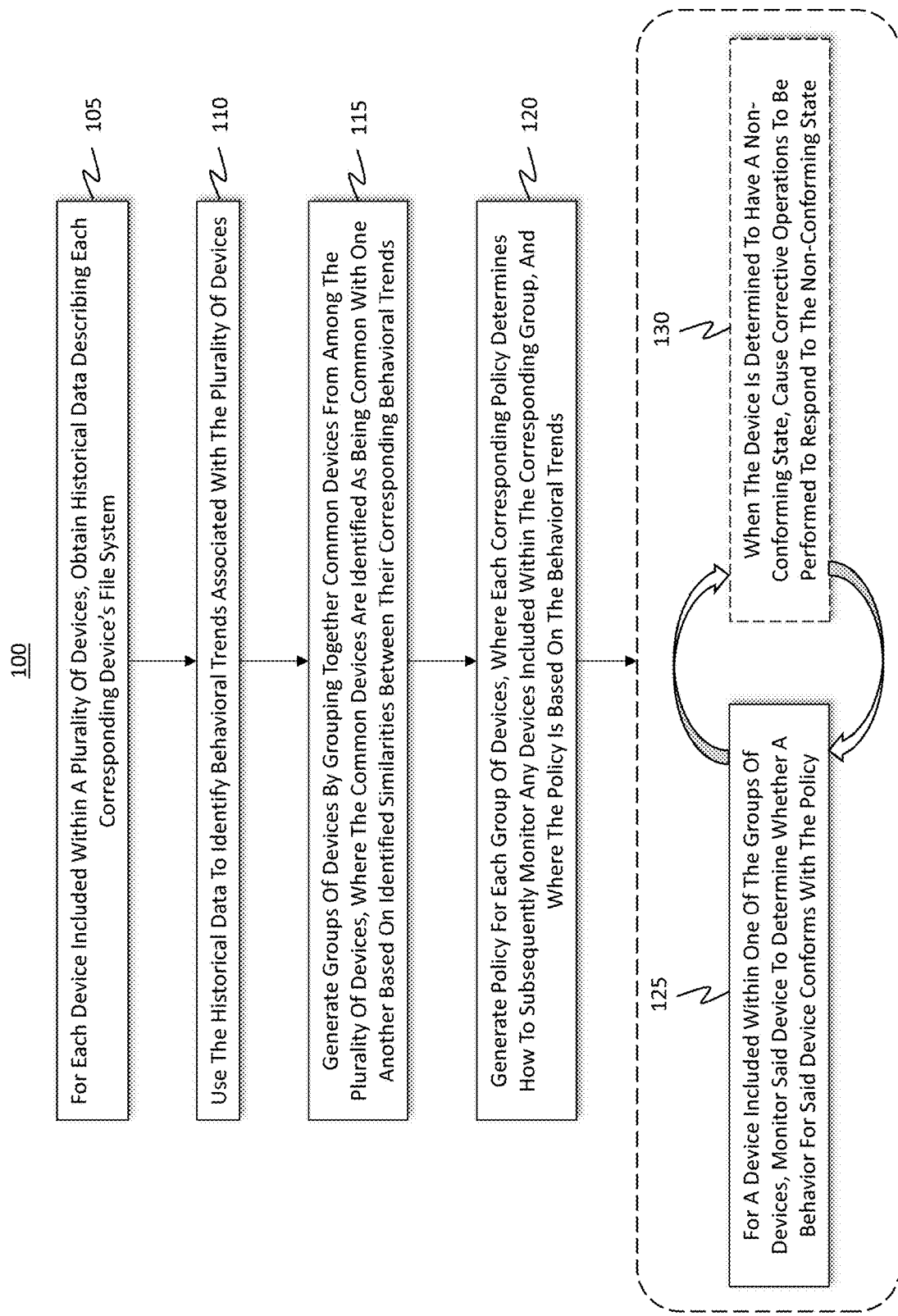
FIG. 1 illustrates a flowchart of an example method for dynamically generating policy based on device behavior and for monitoring a device to determine whether its behavior conforms with the policy.

Disclosed embodiments relate to computer systems, methods, and devices that generate policy and that monitor a device to determine whether the device's behavior conforms with the policy. In some instances, when the monitored device's behavior is determined to be non-conforming, then different corrective operations may be performed to respond to the non-conforming behavior.

In some embodiments, historical data is obtained from multiple devices, where the historical data describes those devices' file systems and where the historical data acts as a corpus of training data to train a machine learning model to identify behavioral trends. This historical data is then used to identify behaviors, trends, or patterns with regard to those file systems. Additionally, the embodiments generate groups of devices by grouping/clustering together common devices based on similarities between their behavioral trends. Once the groups are formed, then a corresponding policy is generated for each of those groups. These policies are derived based on the identified behavioral trends. Furthermore, these policies include rules that determine how any devices included within a policy's corresponding group will subsequently be monitored and perhaps even acted upon when certain conditions occur. For instance, when a device is identified as belonging to a particular group, then that device is monitored to determine whether its behavior conforms with the group's corresponding policy. In some cases, corrective action will be performed when the device's behavior is determined to be non-conforming.

Technical Benefits

The disclosed embodiments may be used to improve the current technology in a vast number of different ways. While some techniques are available to protect specific types of IoT devices from malicious attacks, such techniques are focused on resolving specific types of attacks and are not capable of being implemented across all types of IoT devices. Stated differently, traditional protection techniques are often purposely designed for a particular type of IoT device. Consequently, the traditional technology fails to provide a common/universal solution that is applicable for all types of IoT devices and for all types of attacks, regardless of how complex an architecture or configuration those devices have.

The disclosed embodiments, however, do provide a universal solution to these needs by utilizing the uniqueness attributable to IoT devices. In particular, the disclosed embodiments improve the technology by detecting any type of attack against IoT devices through the use of those devices' widespread/common characteristic of having relatively small diversity in their normal operating behaviors. That is, although IoT devices are configured to perform a wide variety of tasks, those devices are typically configured to perform only those tasks and not any additional, or rather unexpected, tasks. In this regard, the diversity of tasks for IoT devices is often quite limited such that each IoT device is normally configured to perform only a selected number of focused operations.

The disclosed embodiments capitalize on the fact that an IoT device's processing is usually very specific (i.e. not diverse) and use that understanding to detect when an IoT device begins to operate in an unanticipated manner (e.g., by performing diverse, deviating, unexpected, unanticipated, or abnormal operations). If the device begins to operate in an abnormal manner, then the embodiments determine that there is a high likelihood that the device is under attack or has been infected with malicious code. Such a solution can be used across all types of IoT devices. As such, this technical solution is hardware agnostic, operating system ("OS") agnostic, and even IoT function agnostic. Accordingly, the disclosed embodiments significantly improve how IoT devices are protected from malicious attacks by more fully understanding those devices' operating trends, behaviors, and other characteristics and by identifying situations in which a device behaves abnormally and by improving the manner in which policies applied to IoT devices are automatically created, modified and/or applied. The disclosed embodiments bring about many benefits by substantially reducing IoT attack surfaces (i.e. vulnerable areas in the IoT device) that are currently not protected at all or that are currently not protected in a robust manner. As will be discussed in more detail later, by following the disclosed principles, significant advantages and benefits may therefore be realized because of the enhanced protections that are provided.

The disclosed embodiments also operate to improve how the user interacts with a IoT device. For instance, if an IoT device is subject to an attack, it will not operate as well as it otherwise might. To illustrate, the device's processing may be labored and experience heightened levels of latency. Such poor performance will adversely impact how the user interacts with the IoT device. By preventing, identifying, and/or mitigating attacks, the disclosed embodiments will thereby improve the user's experience in interacting with the IoT device because the IoT device will not be subject to the above problems, and the user's interactions with those devices will not be slowed down by the latency.

It also follows, then, that the disclosed embodiments improve how an IoT computing device actually operates. That is, the disclosed embodiments directly improve the efficiency of the IoT device. When subjected to an attack, it will be appreciated that an IoT device will not be as efficient as it otherwise would be. Accordingly, by preventing, identifying, and/or mitigating malicious attacks, the IoT device will be able to operate in the manner it was desired to operate. As such, the disclosed embodiments not only improve (1) the technology and (2) the user's experience with that technology, but they also operate to improve (3) the efficiencies of the IoT computing device itself and (4) the manner in which policies for utilizing the technologies are created and applied.

Example Method(s)

Attention will now be directed to FIG. 1 which refers to a number of method acts that may be performed. Although the method acts may be discussed in a certain order or illustrated in a flow chart as occurring in a particular order, no particular ordering is required unless specifically stated, or required because an act is dependent on another act being completed prior to the act being performed. The method presented in FIG. 1 is provided to introduce the disclosed embodiments while subsequent portions of the disclosure will more fully clarify different and/or additional aspects of the disclosed embodiments.

FIG. 1 illustrates a flowchart of an example method 100 for generating policy rules based on device behavior and for applying those policy rules to determine whether a particular device is conforming or is not conforming with the policy rules. Such operations may be performed to identify an attack against the device (e.g., an IoT device) and also may be used to determine how and when to perform corrective operations in response to such an attack. Initially, method 100 includes an act 105 where, for each device included within a set of multiple devices (e.g., 2, 3, 4, 5, 10, 50, 100, 1,000, 1,000,000 devices, or any number of devices), historical data is obtained for each of those devices. This historical data describes each device's corresponding file system and will be used as a corpus of training data to enable a machine learning model to learn about those file systems and those file systems' behaviors. In some instances, each of these devices is an IoT device that includes at least one processor and a communication interface.

Figure 2:
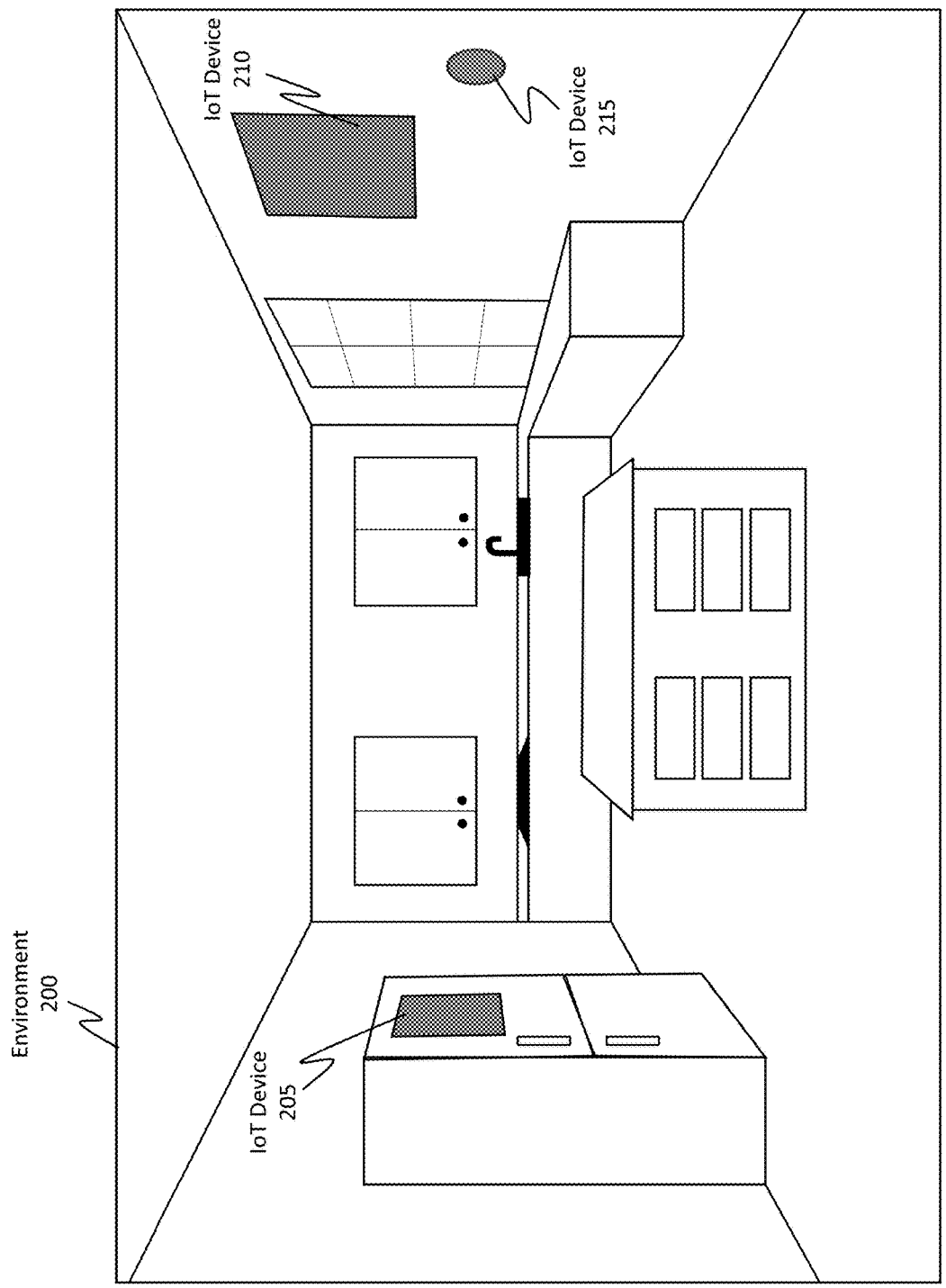
FIG. 2 illustrates an example environment that includes many different IoT devices, such as, but not limited to, a smart refrigerator, a smart thermostat, and a smart television ("TV").

For example, turning briefly to FIG. 2, there is shown an example environment 200 that includes three different IoT devices, namely IoT device 205 (e.g., a smart refrigerator), IoT device 210 (e.g., a smart TV), and IoT device 215 (e.g., a smart thermostat). Although only three IoT devices are shown in environment 200, it will be appreciated that any number of devices may actually be present. IoT devices 205, 210, and 215 may all be interconnected with one another and also may all be connected to the Internet (e.g., via a router, via a cell telecommunications network such as a 3G network, 4G network, or via any other connection mechanism). The disclosed embodiments are able to collect file system information from each of the devices in environment 200, where the file system information becomes the so-called historical data. Additional detail regarding this historical data will be provided later in connection with some of the subsequent figures. The disclosed embodiments are also able to collect historical data from any number of other environments all across the world. In this regard, a repository may be created to store all of the different historical data from any number of different environments. Although a larger repository of historical data will provide a more complete description of IoT device behaviors, the disclosed embodiments may also use smaller repositories. As such, the repository is highly scalable and flexible and can support any amount of training/historical data.

Returning to FIG. 1, the embodiments may acquire and retain any type of data describing the file systems for those devices (e.g., IoT devices 205, 210, and 215 from FIG. 2). This data may include metadata about the file system, actual contents of the file system, or any other data describing the file system (e.g., libraries, dependencies, executables, etc.). If private/personal data is included in the obtained historical data, then the embodiments can scrub the private/personal data prior to persisting the historical data or prior to operating on the historical data.

Figure 3:
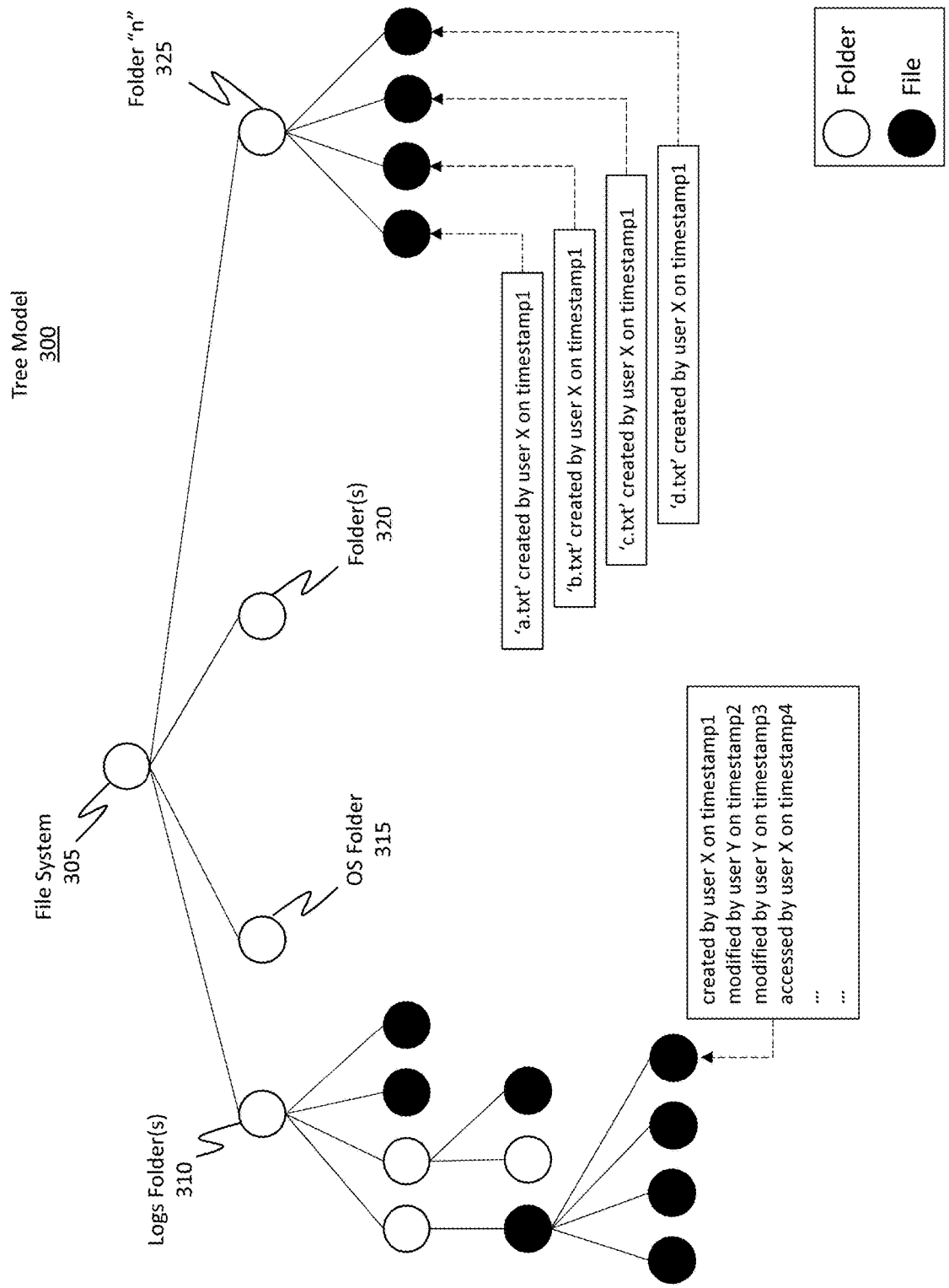
FIG. 3 illustrates an example tree model that is used to characterize and describe an IoT device's file system, including its log folders, operating system ("OS") folders, any files in those folders, and any other file system information.

FIG. 3 provides an example tree model 300 describing the contents of a device's file system 305 (i.e. describing some of the historical data that may be obtained). As shown, file system 305, in some cases, includes log folder(s) 310, operating system ("OS") folder(s) 315, other collections of folder(s) 320, or even an individual folder (e.g., folder "n" 325). Tree model 300 may include a description about folders as well as individual files included in those folders. For instance, the white circles are representative of folders while the dark circles are representative of files. As such, the historical data may include any type of descriptive data for these files and folders (e.g., metadata, dependencies, executables, libraries, relationships, timestamps, creation date, modification date, deletion date, owner or administrator information, data describing the user who created, edited, or deleted a file or folder, and so on).

As further shown in FIG. 3, one of the log files includes timestamp data. For instance, one of the files reads "created by user X on timestamp1"; "modified by user Y on timestamp2"; "modified by user Y on timestamp3"; and "accessed by user X on timestamp4." In contrast, one of the files in folder "n" 325 reads "'a.txt' created by user X on timestamp1"; "'b.txt' created by user X on timestamp1"; "'c.txt' created by user X on timestamp1"; and "'d.txt' created by user X on timestamp1" From this description, it will be appreciated that the tree model 300 may include any quantity of files, folders, or other data that is used to describe the IoT device's actual file system (whereas file system 305 in tree model 300 is just a description of the IoT device's actual file system).

Furthermore, it will be appreciated that the embodiments are able to obtain and/or generate the tree model 300 which describes the IoT device's actual file system. To clarify, in some embodiments, a command is sent to an IoT device instructing the IoT device to summarize its file system so as to create the tree model 300, which is then communicated to a server or other computing device that performs method 100 from FIG. 1. In other embodiments, a command is sent to the IoT device, instructing it to send the contents of its file system to the server, so the server can then generate the tree model 300. In such scenarios, the IoT device can send the data in scheduled or periodic bursts to reduce the amount of network congestion at any one time.

By monitoring the file system 305 over a period of time (e.g., seconds, minutes, hours, days, weeks, months, or even years), the tree model 300 can be used to map or describe the operating behavior of the IoT device's actual file system. That is, by monitoring the actual file system during different time periods, either periodically or randomly, the tree model 300 can record the state/status of the actual file system across these different time periods.

By way of an example, consider a scenario where an IoT device is monitored over a period of two weeks. During this two-week time period, the IoT device is monitored as performing operation "A" every 10 minutes and performing operation "B" at the end of every day. This behavior continues, without any change, for the entire two-week time period. Based on this collected data, the disclosed embodiments can predict, with a high degree of certainty, that the IoT device will likely continue to perform operations "A" and "B" in accordance with the detected time-based pattern. Furthermore, because no other operations were detected during that time period, the embodiments can predict with a reasonably high certainty that the IoT device's normal behavior consists of performing only operations "A" and "B" and that any other operations would be outside of the IoT device's normal operational state. In this regard, the process of identifying behavioral trends may include determining a time range or time instance when folders, files, or other file system portions are normally modified and/or accessed.

Accordingly, the obtained historical data may be obtained for a selected time period during which at least some of the devices perform operations and may be used to identify normal operational behaviors. Example techniques for collecting the historical data will now be described with respect to FIGS. 4A and 4B.

Figure 4B:
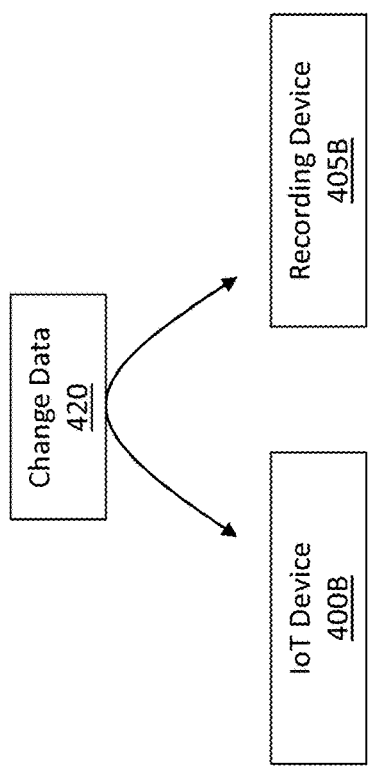
FIGS. 4A and 4B illustrate some example techniques for acquiring descriptions of an IoT device's file system. These techniques include, but are not limited to, performing a snapshot of the file system or, alternatively, acquiring file system information each time a triggered change to the file system occurs.
Figure 4A:
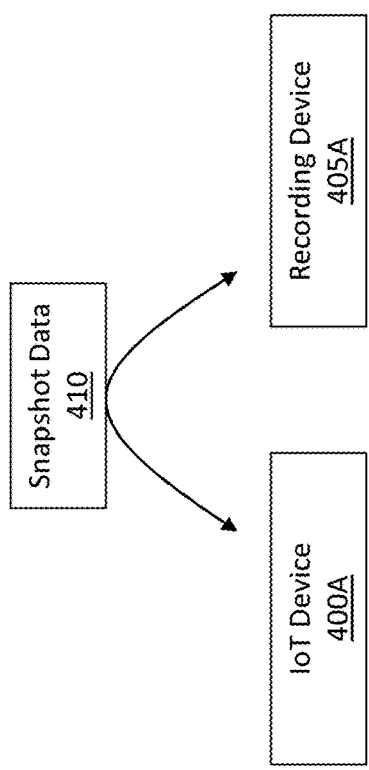
Figure 4A:
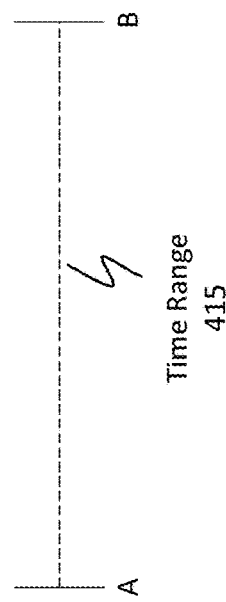

FIG. 4A shows an example scenario in which the file system (e.g., file system 305 from FIG. 3) of an IoT device 400A is being periodically monitored by a recording device 405A (e.g., the server that was mentioned earlier) via a snapshot operation of the device's file system. That is, the recording device 405A is acquiring snapshot data 410 from the IoT device 400A, where the snapshot data 410 may include all or selected portions of the information described with respect to FIG. 3 (e.g., the metadata, dependencies, executables, folders, files, etc.). In some embodiments, this snapshot data 410 is repeatedly acquired during a particular time range 415. With reference back to the two-week example, the time range 415 may be two weeks, and the snapshot data 410 may be repeatedly acquired throughout that two-week period so the recording device 405A is able to identify the "A" and "B" operation pattern. By "repeatedly acquired," it will be appreciated that any time period/frequency may be followed to acquire the data. Some non-limiting example time periods include, but are not limited to, every 5 seconds, 10 seconds, 30 seconds, 1 minute, 2 minutes, 5 minutes, 10 minutes, 1 hour, 6 hours, 12 hours, 1 day, 2 days, and so forth.

As another example, with reference to the log data described earlier in FIG. 3 (e.g., "created by user X on timestamp1"), the snapshot data 410 may include log entries spanning between a start time and an end time (i.e. time range 415). In some embodiments, the snapshot data 410 is obtained at random time intervals or at periodic time intervals (e.g., 10 seconds, 30 seconds, 1 minute, 10 minutes, 100 minutes, 1 day, and so forth) while in other embodiments the snapshot data 410 is obtained when a threshold number of new log entries are recorded. For example, the embodiments may acquire new snapshot data when 10 new log entries have been recorded since the last time snapshot data was obtained (or 20 log entries, 100 log entries, 200 log entries, 1,000 log entries, 2,000 log entries, and so on). In some embodiments, the recording device 405A queries or polls the IoT device 400A to obtain the snapshot data 410 while in other embodiments the IoT device 400A is configured to automatically push/transmit the snapshot data 410.

In contrast to embodiments that periodically query or poll, some embodiments obtain file system descriptive/historical data only when the file system experiences a change to one or more of its files or folders, as shown in FIG. 4B. Here, there is shown an IoT device 400B and a recording device 405B. When a change to IoT device 400B's file system occurs, then the IoT device 400B may be configured to automatically and in real-time provide change data 420 to the recording device 405B (i.e. the historical data is obtained in real-time by collecting file system data each time a portion or all of the device's file system is modified). By way of clarification, recording device 405B may initially be seeded or provided with a first full description of the IoT device 400B's file system. Upon detection of a change, the IoT device 400B may then send only a description (e.g., a log entry) of the specific portion of its file system that changed (hence the change data 420) as opposed to sending a full description of its file system. In this regard, the recording device 405B receives incremental data that describes only changes.

It will be appreciated that some embodiments are configured to receive change data 420 only for specified portions or areas of the file system as opposed to receiving all changes for all portions of the file system. For instance, content included in a "Temporary Internet Files" folder may not be of interest when learning of the IoT device's behavior. In contrast, content included in an OS log file may be of prime importance. As such, some files and folders may be determined to have a higher importance than other files or folders. The disclosed embodiments, therefore, can establish a minimum threshold importance level when determining which changes will be transmitted, which files will be monitored, which folders will be monitored, or any other file system portion will be monitored.

Accordingly, the recording device 405B in FIG. 4B may not need to acquire data over a particular time period/range (e.g., time range 415). Instead, the recording device 405B may receive the change data 420 each time a change occurs. In some embodiments, in order to trigger the transmission of the change data 420, the detected change is required to be a major change (e.g., a change that may significantly impact the performance of the IoT device) as opposed to a minor change (e.g., a change that has little to no effect on the performance of the IoT device). As an example, a major change may include a system update, performance of an entirely new operation or task, deletion of an existing operation or task, or even reassignment of priorities between operations or tasks. A minor change, on the other hand, may include the adoption of a small delay into an operation or task (such that the operation/task is still performed, but it is performed after a small delay), a minor file or folder renaming operation (but no change in functionality associated with the file or folder), or any other relatively inconsequential operation that may occur on the IoT device. Of course, the above features may be associated with the embodiment presented in FIG. 4A or any of the other embodiments as well.

Consequently, as compared to the embodiment in FIG. 4A, the embodiment in FIG. 4B may operate on smaller units of data, but the embodiment in FIG. 4B may receive more communications than the embodiment in FIG. 4A. Accordingly, the embodiments are highly configurable to support any number of different design constraints (e.g., network bandwidth restrictions) or other design parameters. Accordingly, FIGS. 3, 4A, and 4B describe embodiments that acquire data describing an IoT device's file system. This file system data constitutes historical data and will be used as training data for a machine learning algorithm/device to identify behavioral trends.

Returning to FIG. 1, method 100 additionally includes an act 110 of using the historical data (e.g., the data included in the tree model 300 from FIG. 3, the snapshot data 410 from FIG. 4A, or the change data 420 from FIG. 4B) to identify behavioral trends associated with the different devices. In some embodiments, data may be collected for each of multiple devices (e.g., the data may be in the form of the tree model 300 from FIG. 3) and retained in a repository that includes a separate tree model for each device. In other embodiments, only a single tree model is created to collectively describe the multiple devices, such that the single tree model includes isolated regions so as to segregate one device's file system data from another device's file system data. Regardless of how the historical data is stored, it is available to operate as training data for a machine learning algorithm to identify any behavioral trends, as described earlier in act 110. Further detail on machine learning will be provided later.

An example will now be helpful. Consider a scenario where a particular IoT device is configured to routinely transmit thermostat data to a user's phone so the user can view the temperature of the user's home at any time. The file system may be configured to record each transmission of thermostat data. For instance, the file system may record each thermostat data transmission in the file system's log files. According to the disclosed principles, the embodiments (e.g., through use of a machine learning algorithm) are able to obtain this log data, analyze the log data, and identify trends, patterns, or other types of behaviors from that data. In this particular scenario, the embodiments would identify that the IoT periodically transmits the same type of information (i.e. temperature data) at a periodic rate. Accordingly, the embodiments are able to identify this IoT device's behavioral trends, which can be used to generate policies of use for similar devices.

As shown, method also includes an act 115 of generating different groups of devices by grouping together common devices from among the set of multiple devices. Here, the common devices are identified as being common with one another based on identified similarities between their corresponding behavioral trends. If, for example, the set of multiple devices included 1,000 IoT devices and among the 1,000 devices there were 157 thermostat devices that behave in a similar manner, then the embodiments will be able to identify that these 157 devices are similar to one another based on their related behaviors. Consequently, a group may be formed, where the group includes the 157 thermostat devices.

Other collected data may also be used to supplement or augment the behavioral data. This other data may include a make and model of the IoT device, a physical location of the device, or even an owner of the device, which may be detected by the same system or which may be received from a remote third party clearing house or information provider.

Figure 5A:
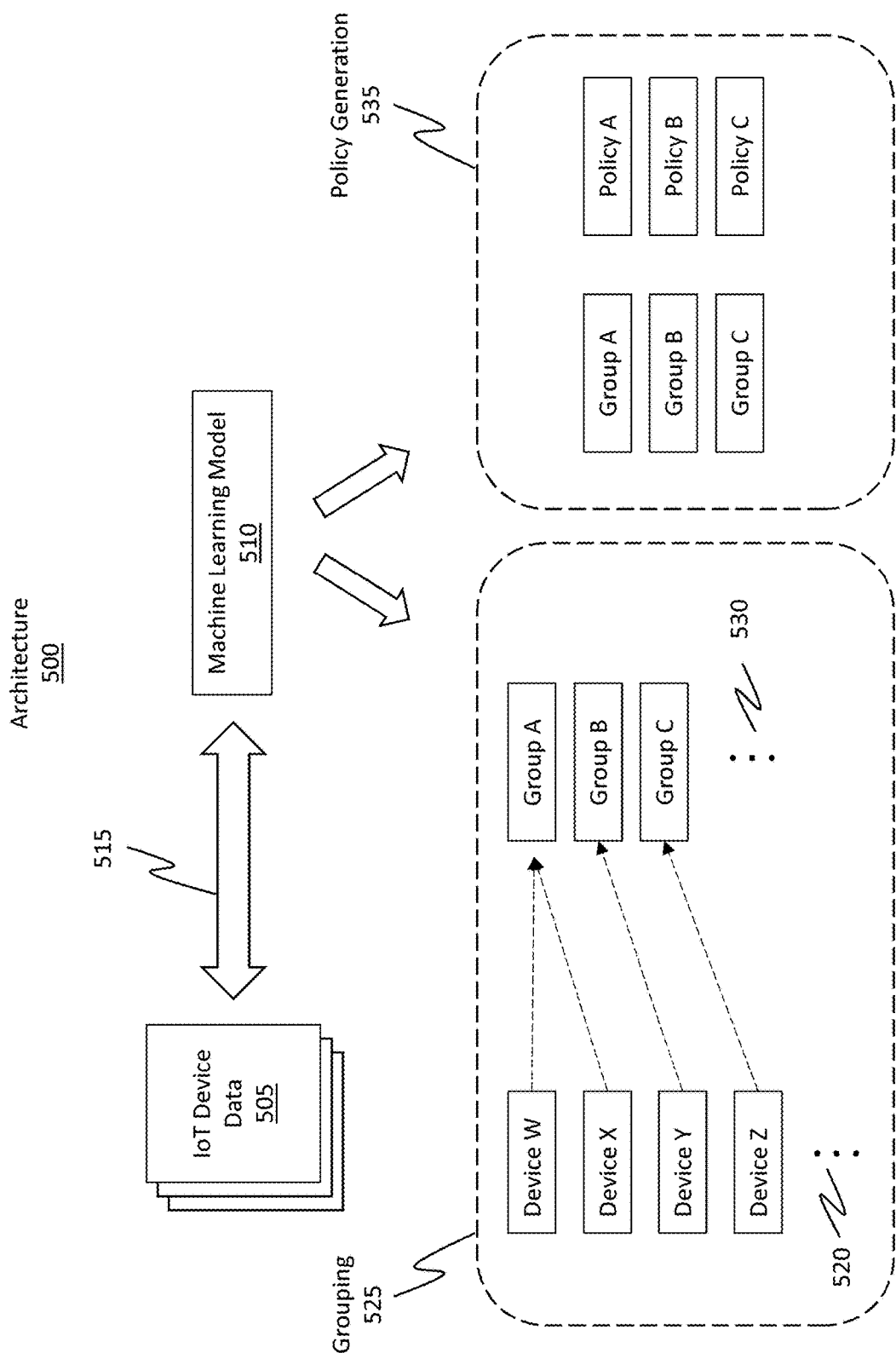
FIG. 5A illustrates an example architecture that compiles IoT file system behavior data and that then performs machine learning on this data to identify trends and other attributes. Using this data, the architecture is then able to group together common devices whose behaviors are similar to one another.
Figure 5B:
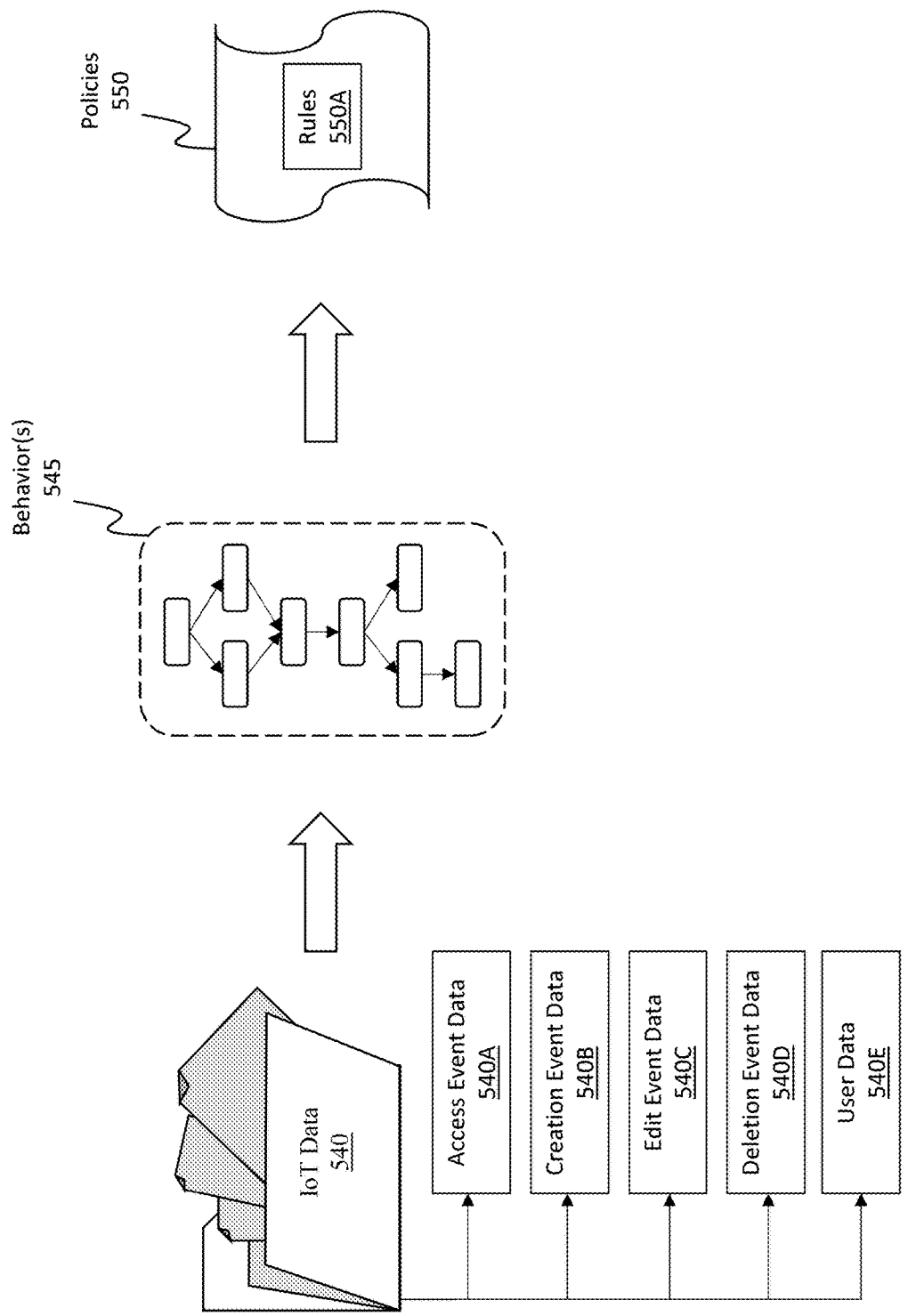
FIG. 5B illustrates some of the IoT data that may be compiled in order to identify behavioral trends and to generate policies.

Based on the behavioral data, it may be determined that a particular device is a smart thermostat. The embodiments are able to further bolster or support this identification by analyzing the make and model of the device, which may also identify the device as being a smart thermostat. Such supplemental data may be used to augment the identified behavioral trends to provide a more robust and accurate identification of the IoT device, including the IoT device's operational configuration. FIGS. 5A and 5B provide some more useful examples related to these aspects and to method act 115.

FIG. 5A shows an example architecture 500 that includes any number of IoT devices and any amount of IoT device data 505 (e.g., the file system data referred to herein as the historical data). Architecture 500 also includes at least one machine learning model 510 (also called a machine learning algorithm, device, engine, or component). As used herein, the machine learning model 510 may include any type of machine learning algorithm or device, multilayer neural network, recursive neural network, deep neural network, decision tree model (e.g., decision trees, random forests, or gradient boosted trees), linear regression model, logistic regression model, support vector machine ("SVM"), artificial intelligence device, or any other type of intelligent computing system. Accordingly, the machine learning model 510 is able to acquire 515 the IoT device data 505 in any of the manners described thus far (e.g., the machine learning model 510 may be representative of the recording device 405A from FIG. 4A or the recording device 405B from FIG. 4B).

Machine learning model 510 may, therefore, be used to identify behavioral trends of IoT devices by analyzing and reviewing the collected IoT file system data (i.e. the corpus of training/historical data) from the IoT device data 505. That is, the IoT device data 505 may be fed as input into the machine learning model 510, and the machine learning model 510 is configured to identify any trends in the data.

FIG. 5A shows Device W, Device X, Device Y, and Device Z, where each of these devices may be an IoT device. The ellipsis 520 symbolically represents that any number of IoT devices may be in communication with and may transmit IoT data to the machine learning model 510.

In some embodiments, the machine learning model 510 is configured to perform a grouping operation 525 on the IoT devices to separate those devices into different groups, such as Group A, Group B, and Group C. The ellipsis 530 shows that any number of groups may be created. Furthermore, the machine learning model 510 is able to group the IoT devices into different groups or clusters based on commonalities between those different devices, and especially between commonalities of those devices' identified behaviors. In some embodiments, the devices are organized into the different groups by performing a density-based spatial clustering (DB-SCAN) using the device's file system data.

As an example, consider a scenario where Device W is an A-type device (e.g., perhaps a smart TV), Device X is a A-type device (e.g., a different type of smart TV), Device Y is an B-type device (e.g., a smart refrigerator), and Device Z is a C-type device (e.g., a smart thermostat). In this example, A-type devices generally perform similar types of operations, as described in those devices' obtained historical data. B-type devices perform similar operations to one another but different operations than A-type devices, and C-type devices perform similar operations to one another but different operations than A-type or B-type devices. Accordingly, by analyzing the devices' behaviors, the machine learning model 510 is able to group Device W and Device X together (e.g., into Group A in FIG. 5A), is able to place/categorize Device Y into a group (e.g., Group B in FIG. 5A), and is able to place Device Z into a group (e.g., perhaps Group C in FIG. 5A).

Although the machine learning model 510 grouped devices W, X, Y, and Z based specifically on their identified device behaviors, any other characteristic or behavior may additionally be used/considered during the grouping process. Examples of characteristics that may be additionally used/considered when grouping devices include, but are not limited to, how devices transmit data (e.g., wired or wireless), how often those devices transmit data, what type of data those devices transmit, where those devices are physically located, whether those devices are included in a same location (e.g., a home, a business, an airport, etc.), the hardware attributes of those devices (e.g., processor type, communication interface type, memory type, etc.), the software and/or OS attributes of those devices, any type of supplemental data as described earlier, or any other type of information attributable to those devices. Accordingly, these other characteristics may also be used to facilitate the grouping process.

Turning briefly to FIG. 5B, there is shown IoT data 540, which is representative of the IoT device data 505 from FIG. 5A. In this scenario, IoT data 540 includes access event data 540A (e.g., which specific users or computer systems accessed or are currently accessing the IoT device and/or file, folder, or other information included on the IoT device as well as how that access was performed, attempted, or achieved) and creation event data 540B (e.g., which files or folders were created by the IoT device during a particular time period as well as timestamp data for those creation events). IoT data 540 additionally includes edit event data 540C describing how a file or folder was modified or edited in any manner (e.g., or perhaps only for changes that satisfy a minimum threshold change amount, as discussed earlier). IoT data 540 also includes deletion event data 540D describing which files or folders were deleted from the IoT device. Additionally, user data 540E is also included in the IoT data 540, where the user data 540E includes any information describing a user of the IoT device (e.g., username, password, avatar, actual name, other identifying information, frequency of use, and so forth). The ellipsis 540F shows how the IoT data 540 may include any other information related to the operations of an IoT device, including the operations of its file system. From this IoT data 540, behaviors 545 of the IoT devices may then be identified, as described earlier in method act 110 in FIG. 1, and the devices may be grouped as previously discussed in connection with FIG. 5A.

Returning now to FIG. 1, method 100 additionally includes act 120 in which policy is generated for each group of devices based on the identified behaviors, where the policy defines a set of anticipated/expected behaviors for those devices. Although each group policy may be somewhat different from one another (e.g., because each group of devices will have different anticipated behaviors), all of the policies are generally related in that they all include rules that, when implemented, determine how to subsequently monitor any device included within a corresponding group (e.g., which specific files, folders, or ports are to be monitored, how long the monitoring will take place, how periodic the monitoring will occur, what operations/tasks are to be monitored, etc.) and all of the policies define a set of anticipated behaviors for the devices in the group.

While the policy may be developed during a set monitoring period, in some instances, the policy may also be updated and dynamically modified, in some instances, based on dynamically detecting an influx or persistence of unanticipated behaviors for a plurality of different IoT devices associated with the grouping/policy.

In some embodiments, the rules also mandate how to respond to a device when that device's behavior is deviating from the anticipated behavior such that the device is not operating normally (i.e. the device's operations do not conform with the historical norms for devices that are identified as being common, related, or similar to that particular device). It will also be appreciated that these policies are derived using the data included in the behavioral trends and potentially using the supplemental data that was discussed earlier. In this regard, the policies define how devices included within a particular group are expected or anticipated to act/behave.

FIGS. 5A and 5B again provide useful examples for this feature. In particular, FIG. 5A shows that the machine learning model 510 is able to perform a policy generation operation 535 in which a policy is generated for each group of devices. For instance, FIG. 5A shows that Policy A is generated for Group A, Policy B is generated for Group B, and Policy C is generated for Group C. It will be appreciated that Policy A is used to control how any Group A devices are to be monitored. Policy A may additionally control how a particular device will be acted upon/responded to when that device is acting abnormally (i.e. its identified behavior does not correlate with its anticipated behavior, as defined by Group A's policy). To further clarify, the embodiments are able to generate a set of anticipated behavior for individual files, folder, libraries, dependencies, and/or other portions of a device's file system and are able to compare those anticipated behaviors against the device's actual behaviors to determine whether the device is acting normally or abnormally. Such operations will be described in more detail later.

Similarly, Policy B is used to control how any Group B devices are to be monitored and/or responded to, and Policy C is used to control how any Group C devices are to be monitored and/or responded to. It should also be noted that a device can be added to a group at any time without restriction. For example, consider a scenario where Device W was added to Group A when Group A was initially formed. Later, however, a new device (e.g., Device V) is identified. By analyzing device V's behaviors and/or supplemental data, the machine learning model 510 is able to group Device V into a corresponding group (e.g., perhaps Group A) and cause that group's policy to be applied to Device V.

In some cases, when a new device (i.e. a device that was not previously known to the system) is identified, that device may already be operating in an abnormal manner. For instance, prior to being introduced to the machine learning model 510 in FIG. 5, the new device might have an existing virus, malware, or some other malicious code operating on it, thereby altering the device's normal operational state. Because of this abnormal state, the new IoT device might not be placed into the correct group. To address such situations, the machine learning model 510 may refrain from using the new device's behavior to categorize the new device into a group. Instead, the machine learning model 510 may categorize the new device into a group based on the supplemental data (e.g., the make, model, etc.) and then immediately identify that the new device is not operating normally. As such, in some embodiments, the supplemental data may be weighted more heavily than the behavioral data when categorizing a new IoT device into a group. Accordingly, the disclosed embodiments are able to group any type of device (e.g., even new devices) based on their identified behaviors and/or other supplemental attributes and to regroup or move devices between groupings.

FIG. 5B further emphasizes how the policy is generated by showing policies 550. In this example, policies 550 include a set of rules 550A that are derived by and/or that are executable by the machine learning model (e.g., machine learning model 510 in FIG. 5A) or some other device (e.g., a server, service, or some of the computing device) to identify how a device is expected/anticipated to operate. In some embodiments, the rules 550A may include instructions on how to monitor a device. Examples of monitoring include, but are not limited to, how frequently the device is to be monitored, what locations of the device are to be monitored (e.g., ports, folders, files, etc.), what information is to be monitored, and so forth. In some embodiments, the rules 550A may include instructions on how to pause or stop operations of the device when a certain condition occurs (e.g., detection of an attack), as will be described in further detail later. In some embodiments, each device included within a group of devices is sent that group's corresponding policy so the comparison between the anticipated behavior and the actual behavior can be performed locally on the IoT device.

Returning to FIG. 1, method 100 also includes an act 125 where, for a device that is now included in one of the groups (e.g., the device was already included in a group or, alternatively, the device is a new device and is dynamically added to a group), that device is now monitored to determine whether a behavior for that device conforms with the group's policy. That is, the device is monitored to determine whether its behavior correlates to an anticipated behavior, as defined by the group's policy.

Here, it will be appreciated that the process of monitoring the device includes monitoring the device's file system (e.g., either the file system as a whole or individual portions/areas of the file system) to determine whether the file system or file system portions are operating in a normal, expected, or anticipated manner, as defined by the policy. To determine whether the device is operating normally, some embodiments capture one, some, or repeated snapshots of the device's file system and then compare these one or more snapshots to the policy. If the device's behavior conforms with the anticipated behavior as outlined by the policy, then the device is determined to be a conforming device. In contrast, if the device's behavior does not conform with the anticipated behavior as outlined by the policy, then the device is determined to be a non-conforming device.

If the device's behavior is identified as conforming with the policy, then no action is needed. That is, the system refrains from performing any kind of mitigation operation because such an operation would be unnecessary.

In contrast, in some embodiments, when the device is determined to have a non-conforming state, then corrective operations may be performed to respond to that non-conforming state, as shown in act 130 of method 100 in FIG. 1. Act 130 is an optional operation and is not required to be performed, hence the flowchart uses a dashed line around act 130. Additionally, method acts 125 and 130 may be repeatedly performed, as shown by the cyclical arrows. Repeatedly performing these operations is beneficial because a device may become infected at any time.

Figure 6:
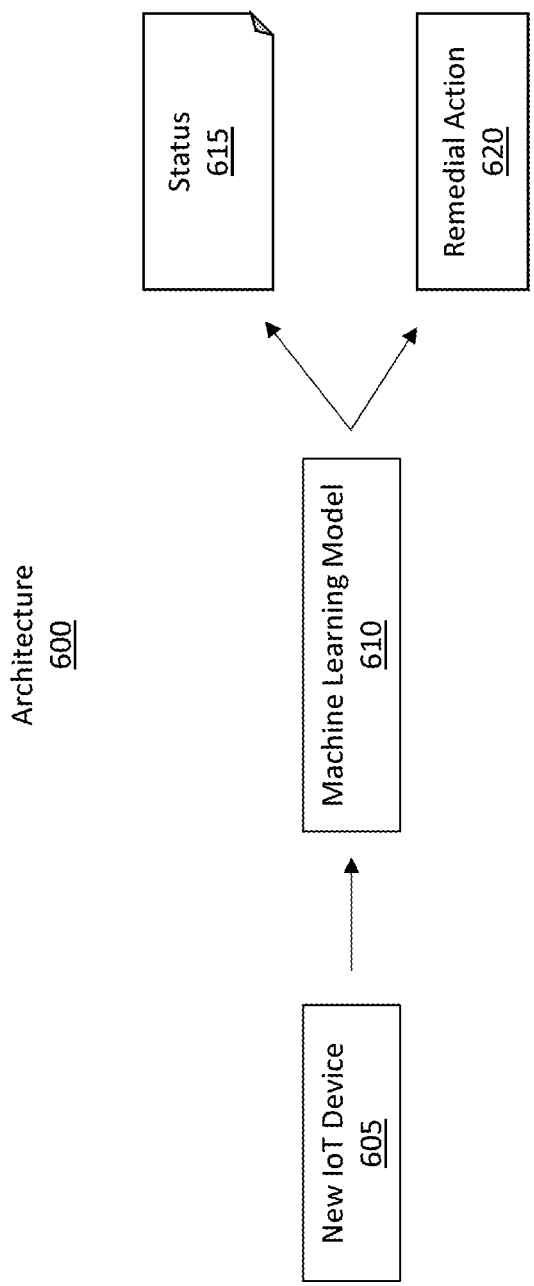
FIG. 6 illustrates an example architecture for applying a machine learning model, which may have been developed using any type of machine learning mechanism, to an IoT device to determine whether that device's behavior conforms with policy rules included in the model.

With regard to the corrective operations, the embodiments may respond in various different ways, as shown in FIG. 6. Specifically, FIG. 6 shows an example architecture 600 that includes a new IoT device 605 and a machine learning model 610, which may be representative of any of the machine learning models discussed thus far. Although the new IoT device 605 is labeled as "new," the device might have been previously monitored or included in one of the identified groups. In other embodiments, the new IoT device 605 is a device that has never been monitored or associated with the architecture 600. As such, the label "new" is for example purposes only and should not be considered limiting.

Furthermore, in the scenario shown in FIG. 6, new IoT device 605 has already been subject to an initial analysis to identify its characteristics/attributes. Based on these attributes, new IoT device 605 has been classified into one of the existing groups. Because new IoT device 605 is assigned to a group, that group's policy will now be used to subsequently monitor how new IoT device 605 operates to determine whether new IoT device 605 is operating in an anticipated manner. In addition to the monitoring functions, machine learning model 610 may also include mitigation/corrective functionality for responding to a scenario in which the new IoT device 605's behavior is not conforming with the group's policy.

In FIG. 6, machine learning model 610 is currently monitoring the activities of new IoT device 605 (e.g., by analyzing the device's current behavior and/or by analyzing at least some of its past behavior as recorded in a log). Based on this monitoring, machine learning model 610 has determined that new IoT device 605 is not behaving in accordance with the group's corresponding policy (i.e. it is not operating in an anticipated manner, as defined by the policy). In response, machine learning model 610 is able to do one or more of the following actions: issue a status report 615 to an interested entity and/or perform one or more remedial actions 620 (i.e. corrective/mitigation operations).

By issuing the status report 615, machine learning model 610 sends an alert, a report, or any other type of notification to the new IoT device 605, to a current operator of the new IoT device 605 (e.g., by displaying an alert when a person is presently interacting with the new IoT device 605), or even to an administrator who generally controls the operations of the new IoT device 605 (e.g., a home owner or business IT professional). In some cases, instead of sending the alert to the new IoT device 605 for the user/administrator (i.e. a receiving entity) to see, machine learning model 610 sends the alert to another device that is associated with the user/administrator. Examples of these other devices include, but are not limited to, a cellphone, laptop, desktop, server, or any other device that is separate from the new IoT device 605 but that may be used to notify the user of the device's abnormal status. Furthermore, machine learning model 610 is able to transmit the alert via any type of communication technique, such as, but not limited to, text message, email, voice message, and so forth. In this regard, sending the status report 615 can act as an alert to inform the user/administrator that the new IoT device 605 is not operating in an expected/anticipated manner (e.g., based on the behavioral trends of the group in which new IoT device 605 is a part).

Additionally, or alternatively, to issuing the status report 615, the machine learning model 610 may perform one or more remedial actions 615 (also referred to herein as correction, prevention, or mitigation). Examples of remedial actions 615 include, but are not limited to, issuing a command to new IoT device 605 to shut down or restart, or issuing a command to new IoT device 605 to pause operations for a specified period of time. Other examples include issuing a command to cause new IoT device 605 to perform a virus or malware scan on itself, or to issue a command to cause a particular task or operation on the new IoT device 605 to stop or restart. Another remedial action 615 includes causing the new IoT device 605 to download a new service package (e.g., new firmware updates, software updates, API updates, driver updates, etc.) to correct new IoT device 605's behavior or to return to an earlier version of an existing service package. Another remedial action 615 includes restricting which users or computers are permitted to interact with the IoT device 605 or a particular file or folder included on that IoT device 605. In other words, specific policy may be generated for a particular file or folder, where the policy includes a rule indicating that only specific users or computers are permitted to access that file or folder. Accordingly, the embodiments may prevent the device from continuing to behave in the non-conforming manner. Of course, any combination of the above operations may also be performed.

The remedial actions may also include modifying an existing policy, as previously described above.

Accordingly, the disclosed embodiments provide significant improvements and advantages to the current technology and particularly for improving the manner in which IoT policies are automatically created and applied to IoT devices. For instance, because a majority of IoT devices are generally all configured to perform specific, non-diverse tasks, benefits may be realized by monitoring those device's file systems. Such monitoring allows for the detection of abnormal/deviating device behavior. If abnormal behavior is identified, then the embodiments can perform any number of corrective/mitigative operations in an attempt to stop, correct, or otherwise alleviate the abnormal behavior. Accordingly, the disclosed embodiments improve how computer systems operate (e.g., by ensuring that they are functioning normally), improve how a user interacts with the computer systems (e.g., by reducing lag or down time), and improve the general technology because malicious activity for IoT devices can now be universally detectable for all types of IoT devices.

Example System(s)

Figure 7:
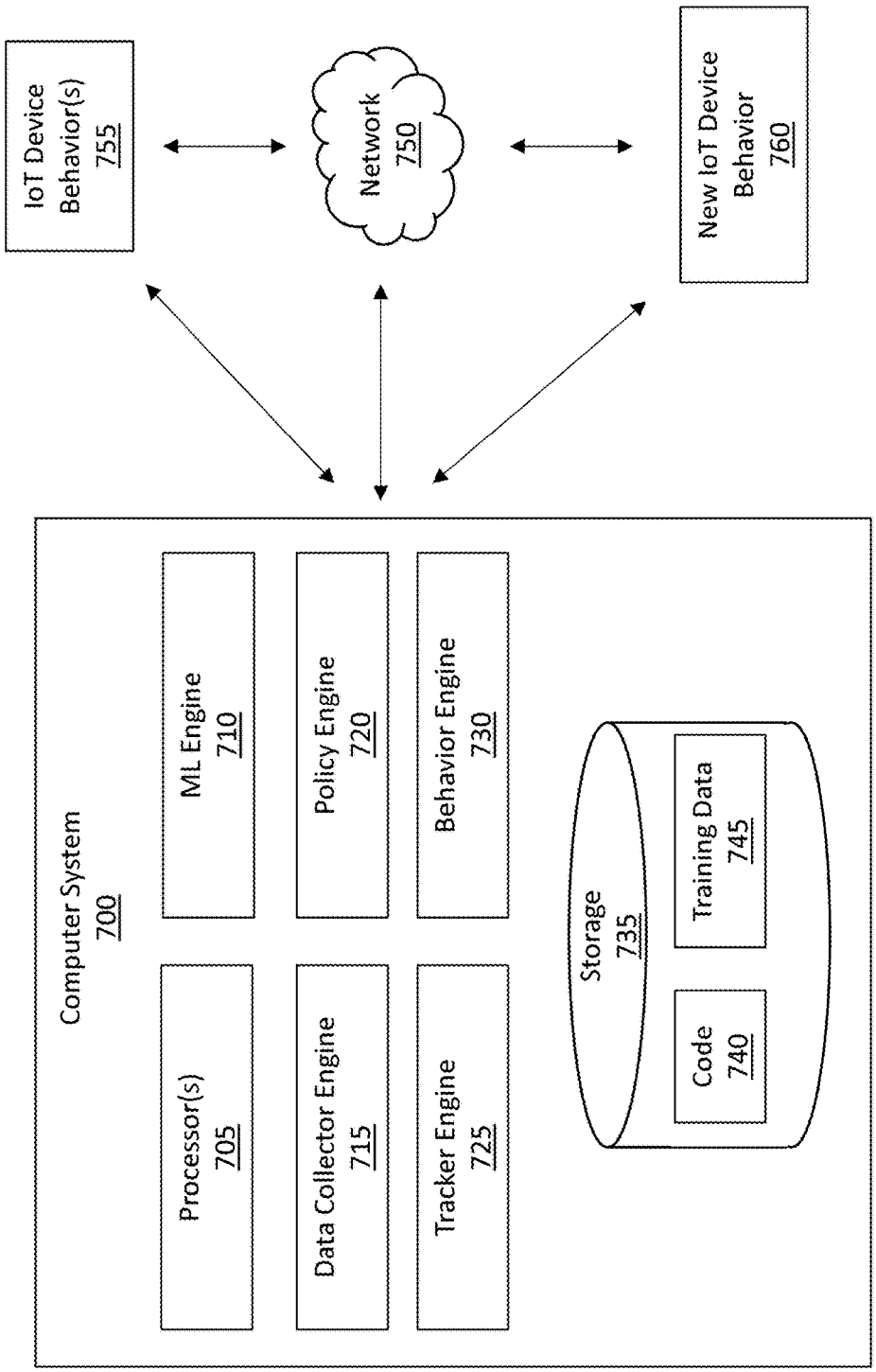
FIG. 7 illustrates an example computer system capable of performing any of the disclosed operations.

Attention will now be directed to FIG. 7 which illustrates an example computer system 700 that may be used to facilitate the operations described herein. Computer system 700 may take various different forms. For example, in FIG. 7, computer system 700 may be embodied as a tablet, a desktop, a distributed system that includes one or more connected computing components/devices that are in communication with computer system 700, a laptop computer, a mobile phone, a server, a data center, and/or any other computer system.

In its most basic configuration, computer system 700 includes various different components. For example, FIG. 7 shows that computer system 700 includes at least one processor 705 (aka a "hardware processing unit"), a machine learning ("ML") engine 710, a data collection engine 715, a policy engine 720, a tracker engine 725, a behavior engine 730, and storage 735.

The storage 735 may include computer-executable instructions in the form of code 740 as well as any amount of training data 745 (e.g., the historical file system data described herein). Storage 735 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

As used herein, the term "executable module," "executable component," "engine," "model," or even "component" can refer to software objects, routines, or methods that may be executed on computer system 700. The different components, models, modules, engines, and services described herein may be implemented as objects or processors that execute on computer system 700 (e.g. as separate threads). It will be appreciated that engines, modules, models, or components may be a combination of one or more processors and executable instructions that cause the processor(s) to perform specialized functions, such as those described throughout this disclosure and in particular with relation to each individual method act described in FIG. 1.

In other instances, the components, modules, models, or engines may simply be executable instructions that are executable by any type of processor. In yet other instances, the components, modules, models, or engines, may be in the form of ASICs or even system-on-chip ("SOC") devices specially configured to perform any individual operation (e.g., any one act included in the method 100 from FIG. 1) or to perform multiple operations (e.g., any combination of the method acts from FIG. 1). In this regard, a component, module, model, or engine can be thought of as a hardware processing unit, a compilation of executable code, or combinations of the above that enable a computer system to perform specialized operations.

The disclosed embodiments may comprise or utilize a special-purpose or general-purpose computer including computer hardware, such as, for example, one or more processors (such as processor 705) and system memory (such as storage 735), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The ML engine 710 may be used to perform any of the machine learning processes described earlier. Furthermore, the ML engine 710 may include any type and/or combination of machine learning algorithm(s) or device(s), including one or more multilayer neural network(s), recursive neural network(s), deep neural network(s), decision tree model(s) (e.g., decision trees, random forests, and gradient boosted trees), linear regression model(s), logistic regression model(s), support vector machine(s) ("SVM"), artificial intelligence device(s), and/or any other type of intelligent computing system. In this regard, the ML engine 710 may be used to generate the machine learning models discussed herein (e.g., machine learning models 510 and 610 from FIGS. 5 and 6, respectively).

Additionally, or alternatively, the data collector engine 715, the policy engine 720, the tracker engine 725, and/or the behavior engine 730 may contribute to the generation of all or portions of the behavioral trends and/or policy. To illustrate, the data collector engine 715 may be used to perform act 105 in method 100 in which the historical data describing the different file systems is obtained. The behavior engine 730 may be used to perform act 110 in which the behavioral trends are identified and/or act 115 in which the devices are grouped based on the behavioral trends. The policy engine 720 may be used to perform act 120 in which the multiple different policies are generated (e.g., a policy for each of the groups). Finally, the tracker engine 725 may be used to perform act 120 in which the new device is monitored to determine whether its behavior conforms with the policy and/or act 130 in which the corrective operations may be performed.

In some embodiments, the ML engine 710 may be used in conjunction with the other engines to perform the method acts in method 100 or any of the other disclosed operations. In some embodiments, the data collector engine 715, policy engine 720, tracker engine 725, and behavior engine 730 are all subcomponents of the ML engine 710. Furthermore, the processors 705 and/or ML engine 710 may also be used to perform any of the steps/acts in method 100 or any of the other disclosed operations.

The training data 745 may correspond to the historical file system data that is obtained from the multiple IoT devices. It will be appreciated that the training data 745 may be stored in a central repository or may be stored in a distributed manner. This training data 745 may be fed as input into the different machine learning components (e.g., the ML engine 710) so the machine learning components can learn the behavioral trends of the IoT devices.

Computer system 700 may also be connected (via a wired or wireless connection) to external sensors (e.g., one or more remote cameras, accelerometers, gyroscopes, acoustic sensors, magnetometers, data acquisition systems, etc.). Further, computer system 700 may also be connected through one or more wired or wireless networks 750 to remote/separate computer systems(s) that are configured to perform any of the processing described with regard to computer system 700. Although not shown, computer system 700 may also include any number of input/output ("I/O") devices (e.g., a display, keyboard, mouse, etc.) or engines (display graphics or a graphics rendering engine) that may be configured, with processor 705, to render one or more images for a user.

A "network," like the network 750 shown in FIG. 7, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 750. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Through network 750, the computer system is able to obtain previous IoT device behavior data 755. As such, the training data 745 may include any of the incoming IoT device behavior data 755.

In this regard, at least some of the training data 745 is stored or maintained by computer system 700 is received from one or more external sources as opposed to being generated by computer system 700 itself. Additionally, through network 750, computer system 700 is able to receive new IoT device behavior 760 either directly from a new IoT device or indirectly via some intermediate proxy. New IoT device behavior 760 may be monitored as part of act 125 in FIG. 1. Furthermore, the new IoT device that transmitted the new IoT device behavior 760 may be instructed to perform any type of mitigation operation, as described earlier.

It will also be appreciated that computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 705). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable hardware storage devices having stored thereon computer-executable instructions that are executable by the one or more processors to cause the computer system to:
for each device included within a plurality of devices, obtain historical data describing each corresponding device's file system;
use the historical data to identify behavioral trends associated with the plurality of devices;
generate groups of devices by grouping together common devices from among the plurality of devices, wherein the common devices are identified as being common with one another based on identified similarities between their corresponding behavioral trends;
generate policy for each group of devices, wherein each corresponding policy determines how to subsequently monitor any devices included within the policy's corresponding group, and wherein each corresponding policy is based on the behavioral trends;
for a device included within one of the groups of devices, monitor said device to determine whether a behavior for said device conforms with the policy;
determine a behavioral trend for a new device that is operating abnormally, wherein the computer system is not yet aware the new device is operating abnormally at a time when the behavioral trend of the new device is determined;
without the computer system being made aware that the new device is operating abnormally, refrain from relying on the new device's behavioral trend to categorize the new device and instead categorize the new device into a specific group of said groups based on non-behavioral supplemental data that is determined for the new device such that the non-behavioral supplemental data is weighted more heavily than the new device's behavioral trend when categorizing the new device; and
subsequent to categorizing the new device into the specific group based on the non-behavioral supplemental data, determine the new device is operating abnormally relative to other devices included in the specific group.

2. The computer system of claim 1, wherein each device in the plurality of devices is an Internet of Things (IoT) device that includes at least one processor and a communication interface.

3. The computer system of claim 1, wherein the obtained historical data is obtained for a selected time period during which at least some devices included in the plurality of devices performed operations.

4. The computer system of claim 1, wherein the obtained historical data is obtained from one or more snapshots of each device's corresponding file system.

5. The computer system of claim 1, wherein the obtained historical data is obtained in real-time by collecting file system data each time a particular portion of each device's file system is modified.

6. The computer system of claim 1, wherein the historical data includes data describing how and when files in each device's file system were modified or accessed, and wherein modifications described by the data include access events, creation events, edit events, or deletion events.

7. The computer system of claim 1, wherein the behavioral trends identify normal operations of the plurality of devices and abnormal operations of the plurality of devices.

8. The computer system of claim 1, wherein the policy includes a set of rules defining which file system portions are to be monitored.

9. The computer system of claim 1, wherein execution of the computer-executable instructions further causes the computer system to:
generate a set of anticipated behaviors for individual files or folders included within a particular device's file system.

10. The computer system of claim 1, wherein a machine learning model identifies the behavioral trends using the historical data.

11. A method for generating policy rules based on identified device behavior and for applying those policy rules to determine whether a particular device is conforming or not conforming with the policy rules, the method being performed by a computer system and comprising:
for each device included within a plurality of devices, obtaining historical data describing each corresponding device's file system;
using the historical data to identify behavioral trends associated with the plurality of devices;
generating groups of devices by grouping together common devices from among the plurality of devices, wherein the common devices are identified as being common with one another based on identified similarities between their corresponding behavioral trends;
generating policy for each group of devices, wherein each corresponding policy determines how to subsequently monitor any devices included within the policy's corresponding group, and wherein each corresponding policy is based on the behavioral trends;
for a device included within one of the groups of devices, monitoring said device to determine whether a behavior for said device conforms with the policy;
determining a behavioral trend for a new device that is operating abnormally, wherein the computer system is not yet aware the new device is operating abnormally at a time when the behavioral trend of the new device is determined;
without the computer system being made aware that the new device is operating abnormally, refraining from relying on the new device's behavioral trend to categorize the new device and instead categorizing the new device into a specific group of said groups based on non-behavioral supplemental data that is determined for the new device such that the non-behavioral supplemental data is weighted more heavily than the new device's behavioral trend when categorizing the new device; and
subsequent to categorizing the new device into the specific group based on the non-behavioral supplemental data, determining the new device is operating abnormally relative to other devices included in the specific group.

12. The method of claim 11, wherein, when a determination is made that said device's behavior does not conform with the policy, the method further includes preventing said device from continuing to behave in a non-conforming manner.

13. The method of claim 11, wherein, when a determination is made that said device's behavior does not conform with the policy, the method further includes issuing an alert to notify a receiving entity regarding a non-conforming behavior of said device.

14. The method of claim 11, wherein the obtained historical data includes data describing specific users who are accessing a particular file or folder.

15. The method of claim 14, wherein specific policy generated for the particular file or folder includes a rule indicating that only the specific users are permitted to access the particular file or folder.

16. One or more hardware storage devices having stored thereon computer-executable instructions that are executable by one or more processors of a computer system to cause the computer system to:
- for each device included within a plurality of devices, obtain historical data describing each corresponding device's file system;
- use the historical data to identify behavioral trends associated with the plurality of devices;
- generate groups of devices by grouping together common devices from among the plurality of devices, wherein the common devices are identified as being common with one another based on identified similarities between their corresponding behavioral trends;
- generate policy for each group of devices, wherein each corresponding policy determines how to subsequently monitor any devices included within the policy's corresponding group, and wherein each corresponding policy is based on the behavioral trends;
- for a device included within one of the groups of devices, monitor said device to determine whether a behavior for said device conforms with the policy;
- determine a behavioral trend for a new device that is operating abnormally, wherein the computer system is not yet aware the new device is operating abnormally at a time when the behavioral trend of the new device is determined;
- without the computer system being made aware that the new device is operating abnormally, refrain from relying on the new device's behavioral trend to categorize the new device and instead categorize the new device into a specific group of said groups based on non-behavioral supplemental data that is determined for the new device such that the non-behavioral supplemental data is weighted more heavily than the new device's behavioral trend when categorizing the new device; and
- subsequent to categorizing the new device into the specific group based on the non-behavioral supplemental data, determine the new device is operating abnormally relative to other devices included in the specific group.

17. The one or more hardware storage devices of claim 16, wherein generating the groups of devices is performed using density-based spatial clustering (DB-SCAN).

18. The one or more hardware storage devices of claim 16, wherein each device included within a particular group is sent that group's corresponding policy.

19. The one or more hardware storage devices of claim 16, wherein the computer system includes the following:
- a data collector engine that obtains the historical data;
- a behavior engine that identifies the behavioral trends;
- a policy engine that generates the policy for each of the groups of devices; and
- a tracker engine that monitors said device.

20. The one or more hardware storage devices of claim 16, wherein identifying the behavioral trends includes determining a time range when certain folders or files are normally modified.

* * * * *